US012235043B1

(12) United States Patent
Cole et al.

(10) Patent No.: US 12,235,043 B1
(45) Date of Patent: Feb. 25, 2025

(54) DESICCATED THYROID EXTRACT MANUFACTURING METHOD

(71) Applicant: ALI Pharmaceutical Manufacturing, LLC, Omaha, NE (US)

(72) Inventors: Ryan Cole, San Diego, CA (US); Austin Soejoto, Omaha, NE (US); Matthew Costanzo, Gretna, NE (US); Andrew Perea, San Diego, CA (US); Nathan Wecker, Blair, NE (US); Daniel Baumann, Omaha, NE (US); Benjamin Wademan, Gretna, NE (US); Shedrick Williams, Omaha, NE (US); Kevin Tang, San Diego, CA (US)

(73) Assignee: ALI Pharmaceutical Manufacturing, LLC, Omaha, NE (US)

( * ) Notice: Subject to any disclaimer, the term of this patent is extended or adjusted under 35 U.S.C. 154(b) by 0 days.

(21) Appl. No.: 18/821,661

(22) Filed: Aug. 30, 2024

(51) Int. Cl.
*F26B 5/04* (2006.01)
*F26B 21/10* (2006.01)

(52) U.S. Cl.
CPC ................ *F26B 5/04* (2013.01); *F26B 21/10* (2013.01); *F26B 2200/02* (2013.01)

(58) Field of Classification Search
CPC ......... F26B 5/04; F26B 21/10; F26B 2200/02
USPC ............................................................ 34/406
See application file for complete search history.

(56) References Cited

U.S. PATENT DOCUMENTS 3,443,961 A * 5/1969 Johnson .................... A23F 5/32 426/387
4,115,928 A * 9/1978 Reichenbacher .... A01N 1/0289 34/92
8,365,433 B2 * 2/2013 Ogura ..................... C10B 53/02 110/251

(Continued)

FOREIGN PATENT DOCUMENTS

CA 3090377 A1 * 8/2019 ......... B01D 11/0203
CA 3199151 A1 11/2023

(Continued)

OTHER PUBLICATIONS

Internet search of porcine thyroid gland material (Year: 2024).*

(Continued)

*Primary Examiner* — Stephen M Gravini
(74) *Attorney, Agent, or Firm* — Foley Hoag LLP; Lucas P. Watkins; Alexander J. Chatterley

(57) ABSTRACT

The present disclosure provides, among other things, methods of drying porcine thyroid gland material and manufacturing DTE comprising vacuum drying porcine thyroid gland material in a way such that the temperature of the porcine thyroid gland material is maintained above a threshold temperature. Since applying vacuum, or reducing pressure, has a cooling effect on the porcine thyroid gland material, maintaining the porcine thyroid gland material above a threshold temperature can be achieved by gradually reducing pressure while simultaneously increasing the heat applied to the porcine thyroid gland material during the period of gradual pressure change. Such methods are advan- (Continued)

Exemplary Vacuum Drying Process tageous in reducing bioburden (killing and impeding the growth of microorganisms) while maintaining therapeutic levels of thyroid hormones, as compared to certain methods of drying porcine thyroid gland material and/or manufacturing DTE known in the art.

30 Claims, 2 Drawing Sheets

(56) References Cited

U.S. PATENT DOCUMENTS

| | | | | |
|---|---|---|---|---|
| 10,006,705 | B2 * | 6/2018 | Wei | F26B 5/04 |
| 10,117,955 | B2 * | 11/2018 | Garcia-Martinez | C07K 16/248 |
| 10,227,589 | B2 * | 3/2019 | Mukherjee | C12N 15/113 |
| 10,729,734 | B2 * | 8/2020 | Goldner | A61K 36/185 |
| 10,743,555 | B2 * | 8/2020 | Deumier | A23B 4/023 |
| 11,719,488 | B2 * | 8/2023 | Poland | A61K 9/19 34/284 |
| 12,092,397 | B2 * | 9/2024 | Andrews | F26B 3/14 |
| 2022/0370530 | A1 * | 11/2022 | Reed | A61K 36/185 |
| 2024/0245609 | A1 * | 7/2024 | Xiao | A61K 9/19 |
| 2024/0280318 | A1 * | 8/2024 | Zhang | F26B 25/001 |

FOREIGN PATENT DOCUMENTS

| | | | | |
|---|---|---|---|---|
| CN | 109464411 | A | 3/2019 | |
| FR | 2999388 | A1 * | 6/2014 | A23B 4/002 |
| JP | 2002519356 | A * | 7/2002 | |
| WO | WO-0000507 | A1 * | 1/2000 | A61K 47/48238 |
| WO | WO-2014115158 | A1 * | 7/2014 | C12N 15/111 |

OTHER PUBLICATIONS

Prahlad, "Induced metamorphosis: rectification of a genetic disability by thyroid hormone in the Mexican axolotl Siredon mexicanum", General and Comparative Endocrinology 11.1: 21-30 (1968).

USP <61> Microbiological Examination of Nonsterile Products: Microbial Enumeration Tests, dated Nov. 21, 2016.

USP <62> Microbiological Examination of Nonsterile Products: Tests for Specified Microorganisms, dated Nov. 21, 2016.

USP, "<1112>" Application of Water Activity Determination to Nonsterile Pharmaceutical Products, United States Pharmacopeia 32-National Formulary 27. Retrieved Sep. 30, 2024.

USP35 NF30, pp. 4855-4856, dated May 1, 2012.

Wu et al., "Determination of iodoamino acids and inorganic lodide by thin-layer chromatography." Analytical Biochemistry 37.2: 313-319 (1970).

* cited by examiner

FIG. 1A Exemplary Vacuum Drying Process
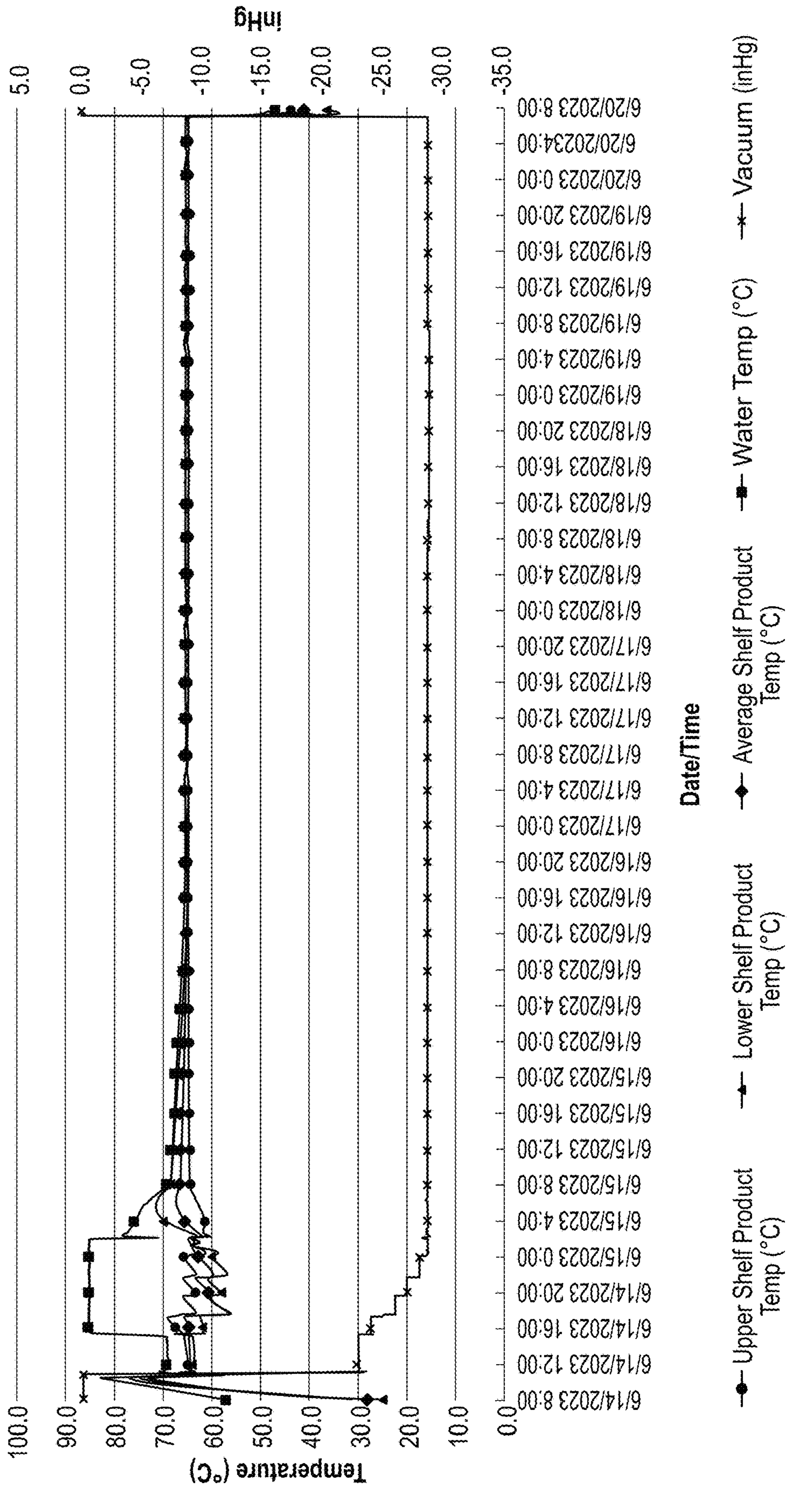

FIG. 1B Control Vacuum Drying Process
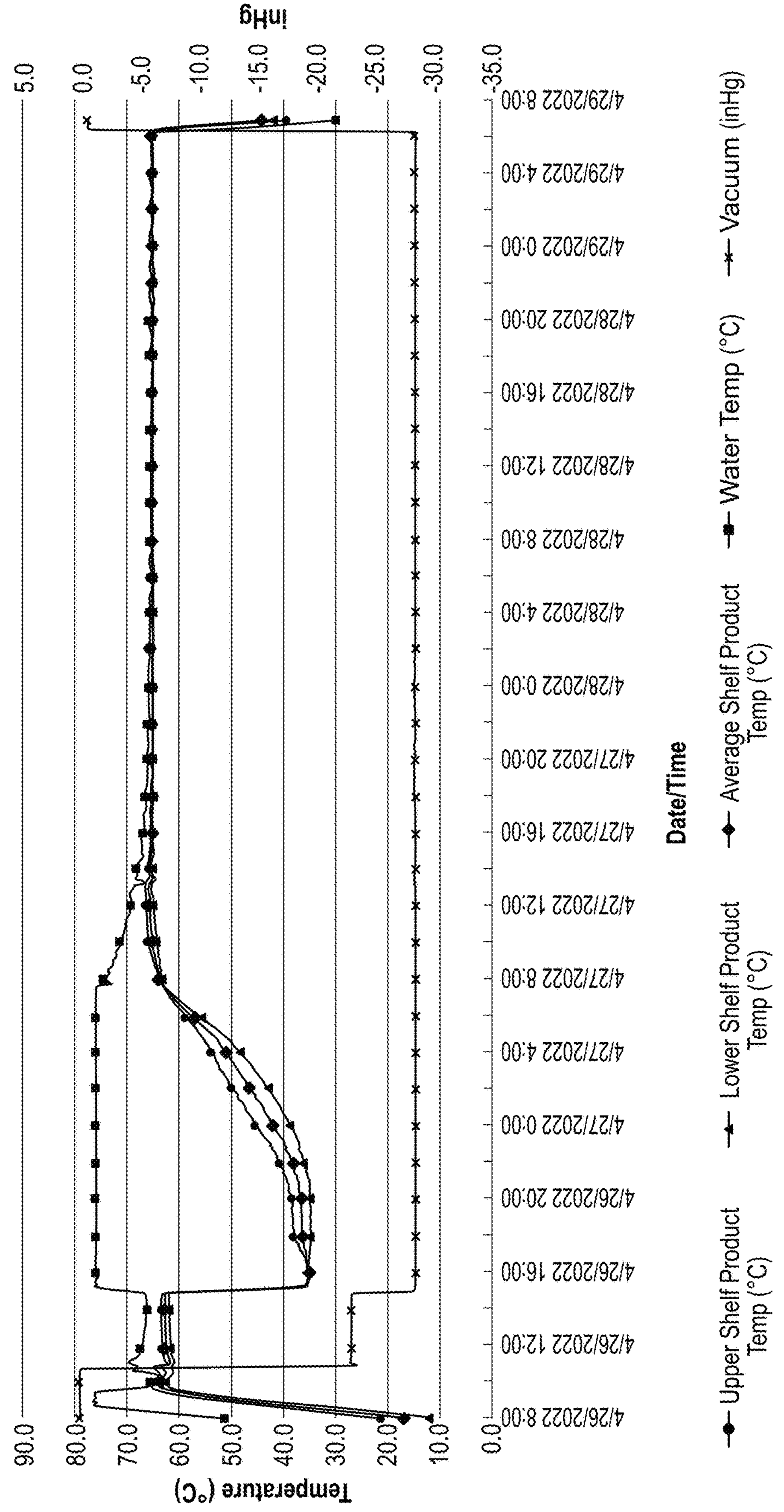

DESICCATED THYROID EXTRACT MANUFACTURING METHOD

BACKGROUND

Currently, there are 3 types of prescription medications available in the US for the treatment of hypothyroidism, a condition characterized by a deficiency of thyroid hormones:

- Levothyroxine (brand name Synthroid), or synthetic thyroxine (T4) tablets, are the standard, US Food and Drug Administration (FDA)-approved, first-line treatment for hypothyroidism;
- Liothyronine (brand name Cytomel), or synthetic triiodothyronine (T3) tablets, are an FDA-approved treatment that is sometimes used as an adjunct to levothyroxine; and
- Desiccated thyroid extract, or DTE (brand names Armour Thyroid and NP Thyroid) tablets (also known as Thyroid Tablets), are a natural source of thyroglobulin, T3 and T4 derived from porcine thyroid glands.

Marketed DTE pharmaceutical products include Armour Thyroid and NP Thyroid. Armour Thyroid has been commercially available in the US for more than 50 years. More than one million patients are currently being treated with DTE pharmaceutical products (Symphony Health Solutions).

The manufacture of DTE involves processing porcine thyroid gland material and requires controlling bioburden (the presence of microorganisms, which is typically measured in terms of total aerobic microbial count [TAMC] and total yeast and mold count [TYMC]) during the production process. There is an ongoing need for methods of manufacturing DTE with reduced bioburden.

SUMMARY OF THE INVENTION

The present disclosure provides, among other things, methods of drying porcine thyroid gland material and manufacturing DTE comprising vacuum drying porcine thyroid gland material in a way such that the temperature of the porcine thyroid gland material is maintained above a threshold temperature. Since applying vacuum, or reducing pressure, has a cooling effect on the porcine thyroid gland material, maintaining the porcine thyroid gland material above a threshold temperature can be achieved by gradually reducing pressure while simultaneously increasing the heat applied to the porcine thyroid gland material during the period of gradual pressure change. Such methods are advantageous in reducing bioburden (killing and impeding the growth of microorganisms) while maintaining therapeutic levels of thyroid hormones, as compared to certain methods of drying porcine thyroid gland material and/or manufacturing DTE known in the art.

BRIEF DESCRIPTION OF THE DRAWINGS

FIG. 1A is a graph of an exemplary vacuum drying process using gradually reduced pressure while simultaneously increasing the heat applied in the form of increased water temperature during the period of the gradual pressure change to produce dried porcine thyroid gland material and subsequently DTE, which shows pressure readings over time in the X line, water (heating element) temperatures over time in the square line, and upper, average and lower shelf product temperatures over time in circle, diamond and triangle lines, respectively. Left Y-axis represents temperature (° C.). Right Y-axis represents vacuum dryer pressure (inHg).

FIG. 1B is a graph of a control vacuum drying process using non-gradually reduced pressure to produce dried porcine thyroid gland material and subsequently DTE, which shows pressure readings over time in the X line, water (heating element) temperatures over time in the square line, and upper, average and lower shelf product temperatures over time in circle, diamond and triangle lines, respectively. Left Y-axis represents temperature (° C.). Right Y-axis represents vacuum dryer pressure (inHg).

DETAILED DESCRIPTION OF THE INVENTION

In certain aspects, the present disclosure provides methods of drying porcine thyroid gland material and manufacturing DTE. Without wishing to be bound by any particular technical or scientific theory, these methods are advantageous in reducing bioburden at least in part because they maintain an elevated temperature of the porcine thyroid gland material during the vacuum drying process, which kills microorganisms present in the porcine thyroid gland material, or impedes their growth. Since applying vacuum, or reducing pressure, has a cooling effect on the porcine thyroid gland material, maintaining the porcine thyroid gland material above a threshold temperature can be achieved by gradually reducing pressure while simultaneously increasing the heat applied to the porcine thyroid gland material during the period of gradual pressure change. Such methods are advantageous in reducing bioburden (killing and impeding the growth of microorganisms) while maintaining therapeutic levels of thyroid hormones as compared to certain methods of drying porcine thyroid gland material and/or manufacturing DTE known in the art.

Maintaining an elevated temperature of the porcine thyroid gland material during the vacuum drying process continuously exposes the microorganisms to an environment in which it is difficult for the microorganisms to survive. Without wishing to be bound by theory, continuously maintaining the porcine thyroid gland material at an elevated temperature, as opposed to allowing the porcine thyroid gland material to intermittently cool down, may avoid selection and regrowth of heat-resistant forms of the microorganisms.

Hypothyroidism

Hypothyroidism is a condition characterized by a deficiency of thyroid hormones. In a healthy person, thyroid hormones are secreted into the blood by the thyroid gland and then carried to every tissue in the body. Thyroid hormones help the body use energy, stay warm and keep the brain, heart, muscles and other organs working properly.

Diagnosis of hypothyroidism is based on a combination of symptoms (e.g., fatigue and weight gain) and the results of blood tests that measure the level of thyroid-stimulating hormone (TSH) and sometimes the levels of the thyroid hormones T3 and/or T4. Since the pituitary gland produces more TSH in response to deficient thyroid hormone levels, a high level of TSH indicates hypothyroidism.

Desiccated Thyroid Extract

Desiccated thyroid extract, or DTE, is derived from porcine thyroid glands. DTE contains thyroglobulin, a natural protein in the thyroid gland and the precursor to the thyroid hormones T3 and T4. As those of skill in the art will appreciate, DTE tablets (also referred to as Thyroid Tablets by United States Pharmacopoeia [USP]) can contain certain ratios of T3 and T4. For instance, the USP has standardized that Thyroid Tablets contain not less than (NLT) 90.0% and not more than (NMT) 110.0% of the labeled amounts of T4 and T3, the labeled amounts being 38 μg of T4 and 9 μg of T3 for each 65 mg of the labeled content. See USP-NF Thyroid Tablets.

Without wishing to be bound by any particular scientific or technical theory, the present disclosure is based at least in part on the surprising discovery that certain methods of drying porcine thyroid gland material and manufacturing DTE are advantageous in reducing bioburden (killing and impeding the growth of microorganisms). These methods comprise vacuum drying porcine thyroid gland material such that the temperature of the porcine thyroid gland material is maintained above a threshold temperature by gradually reducing pressure while simultaneously increasing the heat applied to the porcine thyroid gland material during the period of gradual pressure change.

In various embodiments, the present disclosure provides a method of drying porcine thyroid gland material comprising: (i) heating the porcine thyroid gland material in a vacuum dryer; and (ii) reducing the pressure in the vacuum dryer to a target pressure while maintaining the temperature of the porcine thyroid gland material above a threshold temperature, thereby manufacturing dried porcine thyroid gland material. Skilled persons will appreciate that the porcine thyroid gland material (e.g., from step (i)) can be in any form (e.g., whole porcine thyroid glands or ground porcine thyroid glands) or in any state (e.g., raw porcine thyroid glands, frozen porcine thyroid glands or thawed porcine thyroid glands). In some embodiments, the porcine thyroid gland material is ground porcine thyroid glands.

In some embodiments, the vacuum dryer can be a vacuum tray dryer or any other suitable type of vacuum dryer (e.g., vacuum plow dryer [agitators], vacuum tumble dryers [Rota-Cone]). In some embodiments, the porcine thyroid gland material can be heated by circulating heated water in shelves containing trays of porcine thyroid gland material being dried in the vacuum dryer. The temperature of the circulating water may be modulated to control the heat being applied to the porcine thyroid gland material. Many suitable methods of measuring the temperature of the porcine thyroid gland material are known in the art. Skilled persons will appreciate that, in certain embodiments, the temperature of the porcine thyroid gland material can be measured with a temperature probe inserted into the porcine thyroid gland material or by other suitable methods. In certain embodiments, the temperature of the porcine thyroid gland material can be measured with a temperature probe placed on the carrying tray containing the porcine thyroid gland material. In certain embodiments, the temperature of the porcine thyroid gland material can be measured with a temperature probe on the shelf containing the carrying tray. In various embodiments, the pressure in the vacuum dryer is reduced with a suitable vacuum device. Numerous vacuum devices or vacuum desiccators are commercially available and suitable for use.

In some embodiments, the method comprises initially heating the porcine thyroid gland material to a temperature higher than about 55° C. In some embodiments, the method comprises initially heating the porcine thyroid gland material to a temperature between about 55° C. and about 85° C. In some embodiments, the method comprises initially heating the porcine thyroid gland material to a temperature between about 65° C. and about 80° C. In some embodiments, the method comprises initially heating the porcine thyroid gland material to about 72° C. In some embodiments, the method comprises holding the temperature of the porcine thyroid gland material near the above temperature levels for a suitable duration prior to reducing pressure in the vacuum dryer.

In some embodiments, the pressure in the vacuum dryer can be reduced gradually at any suitable rate. In some embodiments, reducing the pressure gradually comprises performing at least 2 discrete pressure reduction steps. In some embodiments, reducing the pressure gradually comprises performing between 2 and 12 discrete pressure reduction steps. In some embodiments, reducing the pressure gradually comprises performing between 4 and 8 discrete pressure reduction steps. In some embodiments, reducing the pressure gradually comprises performing about 6 discrete pressure reduction steps. In some embodiments, reducing the pressure gradually comprises a step of reducing the pressure in a continuous fashion.

In some embodiments, the target pressure is between about-15 inHg and about-30 inHg. In some embodiments, the target pressure is between about-20 inHg and about-30 inHg. In some embodiments, the target pressure is about-23 inHg. In some embodiments, the target pressure is about-28.5 inHg.

In some embodiments, maintaining the temperature of the porcine thyroid gland material, which may be monitored during the pressure reduction process, above the threshold temperature comprises reducing the pressure in the vacuum dryer to the target pressure while simultaneously increasing (either manually or automatically) the heat applied to the porcine thyroid gland material. In some embodiments, as described above, the vacuum dryer comprises a heated water supply configured to heat the porcine thyroid gland material. In some embodiments, the threshold temperature of the porcine thyroid gland material is between about 40° C. and about 60° C. In some embodiments, the threshold temperature of the porcine thyroid gland material is between about 45° C. and about 55° C. In some embodiments, the threshold temperature of the porcine thyroid gland material is about 50° C. In some embodiments, while reducing the pressure, the temperature of the heated water supply reaches a temperature higher than about 70° C. In some embodiments, while reducing the pressure, the temperature of the heated water supply reaches a temperature between about 70° C. and about 100° C. In some embodiments, while reducing the pressure, the temperature of the heated water supply reaches a temperature between about 80° C. and about 95° C. In some embodiments, while reducing the pressure, the temperature of the heated water supply reaches about 88° C.

In some embodiments, a target temperature of the porcine thyroid gland material once vacuum is applied is higher than about 55° C. In some embodiments, the target temperature of the porcine thyroid gland material once vacuum is applied is between about 55° C. and about 85° C. In some embodiments, the target temperature of the porcine thyroid gland material once vacuum is applied is between about 60° C. and about 70° C. In some embodiments, the target temperature of the porcine thyroid gland material once vacuum is applied is about 65° C.

In some embodiments, the method disclosed herein comprises holding the target pressure. In some embodiments, the method disclosed herein comprises holding the target pressure for between about 2 days and about 10 days. In some embodiments, the method disclosed herein comprises holding the target pressure for between about 3 days and about 8 days. In some embodiments, the method disclosed herein comprises holding the target pressure for about 5 days.

In some embodiments, the method further comprises processing the dried porcine thyroid gland material into DTE. Subsequent to vacuum-drying, the dried porcine thyroid gland material may undergo regrinding, fat extraction, milling and blending. Methods of regrinding, fat extraction, milling and/or blending may be performed according to any suitable method (e.g., fat extraction may be performed using diethyl ether, acetone or hexane).

DTE can be required to meet microbial limits. For instance, the USP has indicated that DTE meets requirements of tests for total microbial count (total aerobic microbial count [TAMC] and total yeast and mold count [TYMC]) and for absence of *Salmonella* species and *Escherichia coli*. See e.g., USP35, pages 4,855-4,856. In some embodiments, the method further comprises measuring TAMC and TYMC of the dried porcine thyroid gland material or the DTE. In some embodiments, the dried porcine thyroid gland material or the DTE has a TAMC of <2,000 cfu/g and a TYMC of <200 cfu/g. In some embodiments, the dried porcine thyroid gland material or the DTE has a TAMC of <1,000 cfu/g and a TYMC of <100 cfu/g. In some embodiments, the dried porcine thyroid gland material or the DTE has a TAMC of <500 cfu/g and a TYMC of <50 cfu/g. In some embodiments, the method further comprises measuring the TAMC and TYMC of the porcine thyroid gland material prior to the step of heating the porcine thyroid gland material in the vacuum dryer. In some embodiments, the TAMC and TYMC of the dried porcine thyroid gland material or the DTE is between about $10^4$-fold and about $10^9$-fold lower compared to the TAMC and TYMC of the porcine thyroid gland material prior to the step of heating the porcine thyroid gland material in the vacuum dryer. In some embodiments, the TAMC and TYMC of the dried porcine thyroid gland material or the DTE is between about $10^6$-fold and about $10^9$-fold lower compared to the TAMC and TYMC of the porcine thyroid gland material prior to the step of heating the porcine thyroid gland material in the vacuum dryer. In some embodiments, the TAMC and TYMC of the dried porcine thyroid gland material or the DTE is between about $10^7$-fold and about $10^9$-fold lower compared to the TAMC and TYMC of the porcine thyroid gland material prior to the step of heating the porcine thyroid gland material in the vacuum dryer. In some embodiments, the method further comprises measuring viral inactivation within the dried porcine thyroid gland material or the DTE. In some embodiments, the dried porcine thyroid gland material or the DTE exhibits full or partial viral inactivation as compared to the thyroid gland before the vacuum-drying process.

Definitions

Unless otherwise defined herein, scientific and technical terms used in this application shall have the meanings that are commonly understood by those of ordinary skill in the art. The methods and techniques of the present disclosure are generally performed, unless otherwise indicated, according to conventional methods well known in the art.

As used herein, "a", "an" and "the" refer to one or to more than one (i.e., to at least one) of the grammatical object of the article. By way of example, "an element" discloses embodiments of exactly one element and embodiments including more than one element.

As used herein, term "about", when used in reference to a value, refers to a value that is similar in context to the referenced value. In general, those skilled in the art, familiar with the context, will appreciate the relevant degree of variance encompassed by "about" in that context. For example, in some embodiments, the term "about" may encompass a range of values within 10%, 9%, 8%, 7%, 6%, 5%, 4%, 3%, 2%, 1% or less of the referenced value.

As used herein, terms "bioburden" or "microbial limit" refer to microorganisms present in pharmaceutical products. Methods of determining bioburden such as TAMC and TYMC are known to those skilled in the art. See e.g., USP <61> Microbial Enumeration Tests, and USP <62> Tests for Specified Microorganisms.

Example

The present disclosure will be more readily understood by reference to the following example, which is included merely for purposes of illustration of certain aspects and embodiments of the present disclosure and is not intended to be limiting.

Bioburden Reduction with Exemplary Vacuum Drying Protocol

The present example of a bioburden reduction study demonstrates and confirms that bioburden can be advantageously reduced with methods of manufacturing dried porcine thyroid gland material and subsequently DTE provided herein comprising a novel vacuum drying process of porcine thyroid gland material. An exemplary graph of the exemplary vacuum drying process is provided in FIG. 1A. An exemplary graph of a control vacuum drying process is provided in FIG. 1B.

In this bioburden reduction study, raw porcine thyroid gland material was incubated at room temperature for 4 days to ensure that the raw material had sufficient bioburden to quantify bioburden reduction. Incubated raw porcine thyroid gland material was then ground and dried with either an exemplary vacuum drying process of the present disclosure (the Exemplary Process hereinafter) or a control vacuum drying process (the Control Process hereinafter).

In both the Exemplary Process and the Control Process, ground porcine thyroid gland material was placed in trays on shelves in a vacuum tray dryer. A temperature probe was inserted into the ground porcine thyroid gland material to measure the temperature. The ground porcine thyroid gland material was heated during the vacuum drying process by circulating water that flowed through the shelves. Heating was controlled by varying the water temperature.

In the Exemplary Process (FIG. 1A), the ground porcine thyroid gland material was heated to a temperature of about 72° C. The temperature of the porcine thyroid gland material was maintained above a threshold temperature of about 50° C. by gradually reducing vacuum tray dryer pressure in 6 steps, first to −23 inHg, then in about 1 inHg increments eventually reaching −28.5 inHg, while simultaneously increasing the heat applied to the porcine thyroid gland material by increasing the temperature of the circulated water up to about 88° C. during the period of the gradual pressure change. The porcine thyroid gland material was continuously maintained near a desired target temperature of about 65° C.

In the Control Process (FIG. 1B), the ground porcine thyroid gland material was heated to a temperature higher than 60° C. Vacuum tray dryer pressure was subsequently reduced in 2 steps, first to −23 inHg and then to −28.5 inHg. The temperature of the porcine thyroid gland material in the vacuum tray dryer dropped to about 35° C. As the pressure stabilized, the porcine thyroid gland material eventually returned to a desired target temperature of about 65° C.

Microbial testing of TAMC and TYMC was measured using USP compendial methods before and after the vacuum drying processes to calculate bioburden reductions through vacuum drying of the porcine thyroid gland material. The dried porcine thyroid gland material was further processed into DTE. Hormone testing of T3 and T4 was performed using common methods to measure the hormone content of DTE.

Data shown in Table 1 demonstrate that methods of manufacturing dried porcine thyroid gland material and subsequently DTE that use the Exemplary Process resulted in greater TAMC and TYMC reductions compared to the Control Process. The improved TAMC and TYMC reductions are believed to be a result of maintaining the temperature of the porcine thyroid gland material above a threshold temperature while the pressure in the vacuum tray dryer is decreased. Maintenance at this temperature above 50° C. in the Exemplary Process facilitated the killing of microorganisms and impeded the growth of microorganisms. Furthermore, DTE manufactured with the Exemplary Process and the Control Process had comparable levels of T3 and T4 post-vacuum drying. The present example shows that the Exemplary Process provides enhanced bioburden reduction while maintaining therapeutic levels of thyroid hormones.

TABLE 1

Exemplary Results of Bioburden Reduction after Exemplary Vacuum Drying Process and Control Vacuum Drying Process

| | TAMC Reduction ($Log_{10}$) | TYMC Reduction ($Log_{10}$) |
|---|---|---|
| Exemplary Vacuum Drying Process | 7.7 (±0.3) | 7.6 (±0.1) |
| Control Vacuum Drying Process | 4.6 (±0.7) | 4.8 (±1.0) |

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method of drying porcine thyroid gland material comprising:

(i) heating the porcine thyroid gland material in a vacuum dryer; and (ii) reducing pressure in the vacuum dryer to a target pressure while maintaining the porcine thyroid gland material above a threshold temperature, thereby manufacturing dried porcine thyroid gland material.

2. The method of claim 1, wherein in step (i) the porcine thyroid gland material is heated to a temperature between about 55° C. and about 85° C.

3. The method of claim 1, wherein in step (i) the porcine thyroid gland material is heated to a temperature between about 65° C. and about 80° C.

4. The method of claim 1, wherein reducing pressure in the vacuum dryer comprises reducing pressure gradually.

5. The method of claim 4, wherein reducing pressure in the vacuum dryer gradually comprises performing at least 2 discrete pressure reduction steps.

6. The method of claim 4, wherein reducing pressure in the vacuum dryer gradually comprises performing between 2 and 12 discrete pressure reduction steps.

7. The method of claim 4, wherein reducing pressure in the vacuum dryer gradually comprises performing between 4 and 8 discrete pressure reduction steps.

8. The method of claim 4, wherein reducing pressure in the vacuum dryer gradually comprises a step of reducing pressure in a continuous fashion.

9. The method of claim 1, wherein the target pressure is between about-15 inHg and about-30 inHg.

10. The method of claim 9, wherein the target pressure is between about-20 inHg and about-30 inHg.

11. The method of claim 1, wherein maintaining the porcine thyroid gland material above the threshold temperature comprises reducing pressure in the vacuum dryer to the target pressure while simultaneously increasing heat applied to the porcine thyroid gland material.

12. The method of claim 1, wherein the threshold temperature of the porcine thyroid gland material is between about 40° C. and about 60° C.

13. The method of claim 12, wherein the threshold temperature of the porcine thyroid gland material is between about 45° C. and about 55° C.

14. The method of claim 1, wherein the vacuum dryer comprises a heated water supply configured to heat the porcine thyroid gland material.

15. The method of claim 14, wherein, while reducing pressure in the vacuum dryer, the heated water supply reaches a temperature between about 70° C. and about 100° C.

16. The method of claim 14, wherein, while reducing pressure in the vacuum dryer, the heated water supply reaches a temperature between about 80° C. and about 95° C.

17. The method of claim 1, wherein a target temperature of the porcine thyroid gland material once vacuum is applied is between about 55° C. and about 85° C.

18. The method of claim 17, wherein the target temperature of the porcine thyroid gland material once vacuum is applied is between about 60° C. and about 70° C.

19. The method of claim 1, comprising holding the target pressure.

20. The method of claim 19, comprising holding the target pressure for between about 2 days and about 10 days.

21. The method of claim 20, comprising holding the target pressure for between about 3 days and about 8 days.

22. The method of claim 1, further comprising processing the dried porcine thyroid gland material into desiccated thyroid extract (DTE).

23. The method of claim 22, further comprising measuring TAMC and TYMC of the dried porcine thyroid gland material or the DTE.

24. The method of claim 23, wherein the dried porcine thyroid gland material or the DTE has a TAMC of <2,000 cfu/g and a TYMC of <200 cfu/g.

25. The method of claim 23, wherein the dried porcine thyroid gland material or the DTE has a TAMC of <1,000 cfu/g and a TYMC of <100 cfu/g.

26. The method of claim 23, wherein the dried porcine thyroid gland material or the DTE has a TAMC of <500 cfu/g and a TYMC of <50 cfu/g.

27. The method of claim 23, further comprising measuring the TAMC and TYMC of the porcine thyroid gland material prior to step (i).

28. The method of claim 27, wherein the TAMC and TYMC of the dried porcine thyroid gland material or the DTE is between about $10^4$-fold and about $10^9$-fold lower compared to the TAMC and TYMC of the porcine thyroid gland material prior to step (i).

29. The method of claim 27, wherein the TAMC and TYMC of the dried porcine thyroid gland material or the DTE is between about $10^6$-fold and about $10^9$-fold lower compared to the TAMC and TYMC of the porcine thyroid gland material prior to step (i).

30. The method of claim 27, wherein the TAMC and TYMC of the dried porcine thyroid gland material or the DTE is between about $10^7$-fold and about $10^9$-fold lower compared to the TAMC and TYMC of the porcine thyroid gland material prior to step (i).

* * * * *